United States Patent
Fujii et al.

(10) Patent No.: US 8,364,001 B2
(45) Date of Patent: Jan. 29, 2013

(54) POLYMER OPTICAL WAVEGUIDE AND METHOD FOR PRODUCTION THEREOF

(75) Inventors: Akira Fujii, Kanagawa (JP); Shigemi Ohtsu, Kanagawa (JP); Keishi Shimizu, Kanagawa (JP); Kazutoshi Yatsuda, Kanagawa (JP); Toshihiko Suzuki, Kanagawa (JP); Masahiro Igusa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 476 days.

(21) Appl. No.: 12/543,045

(22) Filed: Aug. 18, 2009

(65) Prior Publication Data

US 2010/0166380 A1    Jul. 1, 2010

(30) Foreign Application Priority Data

Dec. 26, 2008   (JP) ................................. 2008-334515

(51) Int. Cl.
  *G02B 6/00*   (2006.01)
  *G02B 6/10*   (2006.01)
(52) U.S. Cl. .......... 385/144; 385/14; 385/131; 385/132; 385/142
(58) Field of Classification Search .................... 385/14, 385/129–132, 142, 144
See application file for complete search history.

(56) References Cited

U.S. PATENT DOCUMENTS

| | | | | |
|---|---|---|---|---|
| 5,761,350 A | * | 6/1998 | Koh | ............................... 385/14 |
| 7,713,767 B2 | * | 5/2010 | Chan et al. | ...................... 438/24 |
| 7,809,228 B2 | * | 10/2010 | Ohtsu et al. | ................... 385/129 |
| 2007/0114684 A1 | | 5/2007 | Ohtsu et al. | |
| 2009/0103858 A1 | | 4/2009 | Ohtsu et al. | |

FOREIGN PATENT DOCUMENTS

| | | |
|---|---|---|
| JP | A-8-286064 | 11/1996 |
| JP | A-2001-311846 | 11/2001 |
| JP | A-2004-226941 | 8/2004 |
| JP | A-2007-140300 | 6/2007 |
| JP | 2009093092 A * | 4/2009 |
| JP | A-2009-103915 | 5/2009 |

* cited by examiner

*Primary Examiner* — Daniel Petkovsek
(74) *Attorney, Agent, or Firm* — Oliff & Berridge, PLC

(57) ABSTRACT

A polymer optical waveguide includes: at least one core through which light propagates; a cladding which surrounds the core and has a refractive index less than that of the core; at least one conductive wire being provided on at least one side of the cladding, the polymer optical waveguide having a sheet shape, the conductive wire including a conductive layer which is provided on the at least one side of the cladding and being partitioned by a first groove, and the core being formed between second grooves each of which is formed in at least a part of the first groove.

9 Claims, 3 Drawing Sheets

PREPARATION OF LAMINATE SHEET

FORMATION OF FIRST GROOVE

FORMATION OF SECOND GROOVE

FILLING OF GROOVES

POLYMER OPTICAL WAVEGUIDE AND METHOD FOR PRODUCTION THEREOF

CROSS-REFERENCE TO RELATED APPLICATION

This application claims priority under 35 USC 119 from Japanese Patent Application No. 2008-334515 filed on Dec. 26, 2008.

BACKGROUND OF THE INVENTION

1. Technical Field

The present invention relates to a polymer optical waveguide and a method for producing the same.

2. Related Art

In the technical field of high-speed signal transmission, electricity, which is widely used as a transmission medium, is approaching limits to its speed of transmission. Thus, optical transmission is expected to eventually replace electrical transmission, and attention is therefore being paid to optical interconnection, which utilizes optical links between instruments and appliances, and/or between boards and/or between chips inside instruments and appliances.

As a technology that enables optical interconnection, a polymer optical waveguide including a core through which light propagates, and which is formed from a polymer having a high refractive index, and a cladding which surrounds the core and is formed from a polymer having a low refractive index, is attracting attention since the materials used therein are flexible, the production costs are low, and the like.

As techniques for producing such a polymer optical waveguide, methods such as the following have been proposed.
(1) A method including impregnating a film with a monomer, selectively exposing a core portion to light so as to change the refractive index at the core portion, and adhering additional films to the film (selective polymerization method).
(2) A method including forming a core layer and cladding layers by coating, and forming a cladding by reactive ion etching (reactive ion etching (RE) method).
(3) A method using photolithography in which a UV-curable resin obtained by adding a photosensitive material to a polymer material is exposed to UV light and developed (direct exposure method).
(4) A method using injection molding.
(5) A method including forming a core layer and cladding layers by coating and exposing a core to change the refractive index of the core (photobleaching method).
(6) A method of producing a polymer waveguide using a mold.

The polymer waveguides produced by the various methods described above are capable of guiding optical signals only, and for example, in the case of carrying out transmission of low-speed electrical signals or supply of electrical power in addition to transmission of high-speed optical signals between printed boards or between modules, it has been necessary to separately install conductive wires in addition to optical wiring.

SUMMARY

According to an aspect of the invention, there is provided a polymer optical waveguide, including:
at least one core through which light propagates;
a cladding which surrounds the core and has a refractive index less than that of the core;
at least one conductive wire being provided on at least one side of the cladding,
the polymer optical waveguide having a sheet shape,
the conductive wire including a conductive layer which is provided on the at least one side of the cladding and being partitioned by a first groove, and
the core being formed between second grooves each of which is formed in at least a part of the first groove.

BRIEF DESCRIPTION OF THE DRAWINGS

Exemplary embodiments of the present invention will be described in detail based on the following figures, wherein.

DETAILED DESCRIPTION

Figure 1:
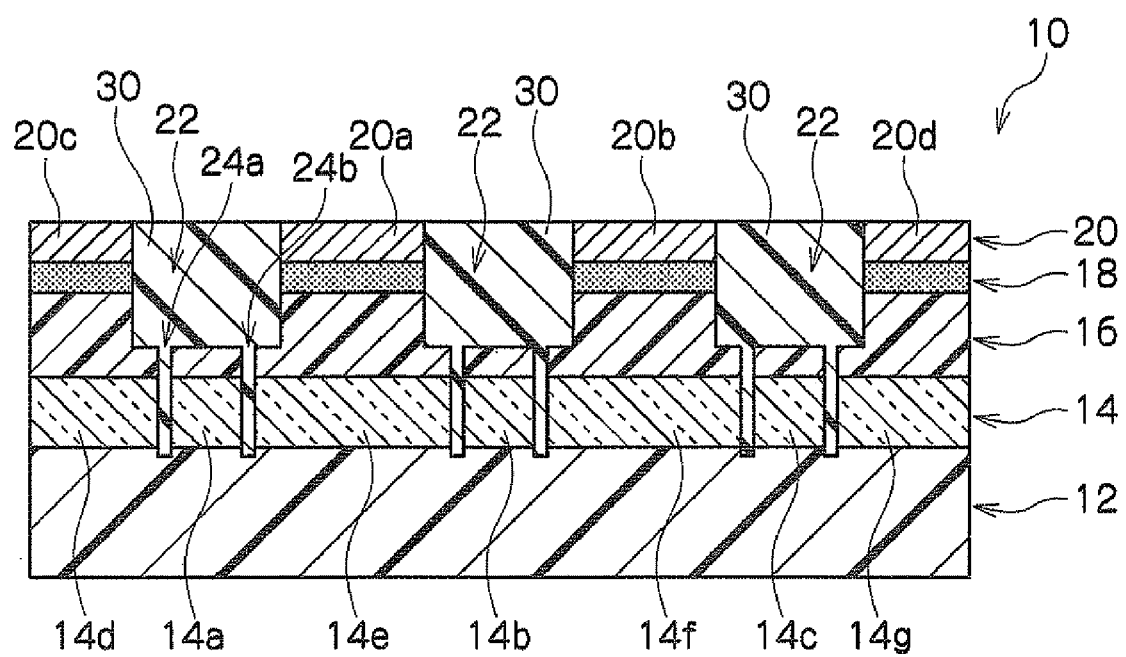
FIG. 1 is a diagram schematically showing the configuration of a polymer optical waveguide according to the first exemplary embodiment of the present invention.

According to exemplary embodiments of the invention, a polymer optical waveguide is provided in which high positional accuracy between a core and a conductive wire is attained, and a method of producing the polymer optical waveguide is also provided.

Hereinafter, exemplary embodiments of the present invention will be described with reference to the attached drawings In the drawings, members having substantially the same functions and actions are given the same reference numerals, or the reference numerals thereof are omitted, and explanations are omitted where appropriate to avoid repetition. Furthermore, since the drawings are intended to make the invention more easily understandable, the shapes, sizes and positional relationships therein are represented schematically. Thus, the specific configurations shown in the drawings are merely examples, and the invention is not intended to be limited to these configurations.

The inventors of the present invention first conducted research and investigation as described below, with regard to an optical waveguide having conductive wires and a method for producing the optical waveguide.

For example, a waveguide sheet having a core and a cladding surrounding the core is provided, and copper foil is adhered on the clad on one side of the waveguide sheet. Subsequently, an etching mask is formed with a resist on the copper foil by photolithography, and then unnecessary copper foil is dissolved and removed by etching. Then, the resist etching mask is further removed, whereby a conductive wire pattern formed of copper is formed. Through the process as described above, a waveguide having conductive wires on at least one side thereof can be obtained.

However, in the methods for producing a polymer optical waveguide having conductive wires as described above, various thin film forming processes such as patterning, exposure/development and etching are carried out upon the production of an electrical wiring pattern, an optical wiring pattern (core) or the like. Thus, a number of complicated processes are required, whereby the production yield is likely to decrease, and the production costs increases.

Furthermore, the waveguide core and the electrical wiring pattern (conductive lines) are formed by separate processes. That is, since the processes are dependent on the accuracy of the mask, or the accuracy of alignment of the mask and the waveguide sheet, a decrease in the positional accuracy of the waveguide core and the electrical wiring is likely to be brought about. In addition, when the waveguide core is located underneath the conductive lines, it is difficult to observe the waveguide core from above. Thus, the accuracy of connection between a core end and another optical device such as a light emitting/receiving device, is likely to decrease.

When a waveguide core and conductive lines is formed in, for example, a sheet having three layers including a cladding layer, a core layer and a cladding layer, which are stacked in this order, by further providing a metal layer on the sheet and forming grooves on the metal layer side, the metal layer is also cut at the same time when the waveguide core is formed. As a result, the blade may become clogged with metal powder generated upon cutting, and lateral surfaces of the core cannot be formed with a high degree of flatness, thereby resulting in a large loss of light propagated through the core.

Also, a method of forming conductive lines by, for example, providing in advance a polymer optical waveguide having core lateral surfaces having high flatness, providing a metal layer on the waveguide, and then cutting the metal layer, may be considered. However, in this case, because the waveguide core is formed underneath the metal layer, the core lines cannot be observed, and not only the parallelism and the positional accuracy of the core lines and the conductive lines are decreased, but also the accuracy of connection between the core and another optical device (for example, a light emitting/receiving device such as a vertical cavity surface-emitting laser (VCSEL) or a photodiode, or an optical fiber) is likely to decrease.

The inventors of the present invention further conducted research and investigation on this matter, and found that an optical waveguide having conductive wires, with which the loss of light propagated through the core can be suppressed and the accuracy of connection with another optical device can be enhanced simultaneously, can be obtained by providing a multilayer sheet in which a cladding layer, a core layer, another cladding layer and a conductive layer are stacked in this order, and forming, on the multilayer sheet, grooves having different depths in a stepwise manner from the conductive layer side to sequentially form conductive wires and a core. In this way, the inventors achieved the present invention.

First Exemplary Embodiment

FIG. 1 schematically shows the configuration of a polymer optical waveguide according to a first exemplary embodiment, as a cross-section viewed from the direction of light propagation.

In the first exemplary embodiment, the polymer optical waveguide 10 has a sheet shape, which means that the polymer optical waveguide 10 has substantially planar outer surfaces.

The polymer optical waveguide 10 according to the present exemplary embodiment has cores 14a, 14b and 14c (which may be referred to as "waveguide cores") through which light propagates; claddings 12, 16 and 30 which surround the cores 14a, 14b and 14c, and which have refractive indices lower than those of the cores 14a, 14b and 14c; and conductive wires 20a and 20b (which may be referred to as "conductive lines") provided on at least one of the claddings of the polymer optical waveguide (in the present embodiment, the conductive wires 20a and 20b are provided on the cladding 16). The cores 14a, 14b and 14c and the conductive wires 20a and 20b each extend in a longitudinal direction of the polymer optical waveguide 10. The conductive wires 20a and 20b do not substantially overlap with the cores 14a, 14b and 14c when viewed from the thickness direction of the polymer optical waveguide. Hereinafter, the cladding 16 on which the conductive wires are provided will be referred to as "upper cladding", while the cladding 12 provided on the opposite side of the upper cladding 16 with respect to the core layer 14 will be referred to as "lower cladding".

An adhesive layer 18 may be provided between the conductive wires 20a and 20b, and the upper cladding 16. Furthermore, dummy cores 14d, 14e, 14f and 14g, through which light does not propagate, are included in the core layer 14 that includes the cores 14a, 14b and 14c. Dummy conductive lines 20c and 20d, which are not used as conductive lines, are included in a conductive layer 20 that includes the conductive wires 20a and 20b. The conductive wires 20a and 20b are each formed between a first groove 22 and another first groove 22, the first grooves 22 each partitioning the conductive layer 20 that has been provided in advance on the upper cladding 16. At least one lateral surface of the cores 14a, 14b and 14c, that is, a lateral surface thereof in the thickness direction of the optical waveguide 10, is formed by second grooves 24a or 24b, which are formed by making a certain area of the first groove 22 deeper. In other words, each of the cores 14a, 14b, and 14c is formed between a second groove 24a and another second groove 24b, where the second groove 24a or 24b is formed by cutting a part of the bottom of the first groove 22 in the thickness direction of the optical waveguide 10. The grooves 22, 24a and 24b are respectively filled with a dielectric material 30.

Throughout the specification, the term "thickness direction" refers to the direction in which the cladding layers, core layers, conductive layer, and the like are stacked. In the invention, the first and second grooves are formed by cutting the optical waveguide substantially in the thickness direction.

Next, a method for producing the polymer optical waveguide 10 according to the present exemplary embodiment will be described, together with various constituent elements of the waveguide, while referring to FIG. 2A to FIG. 2D.

(1) Preparation of Multilayer Sheet

Figure 2A:
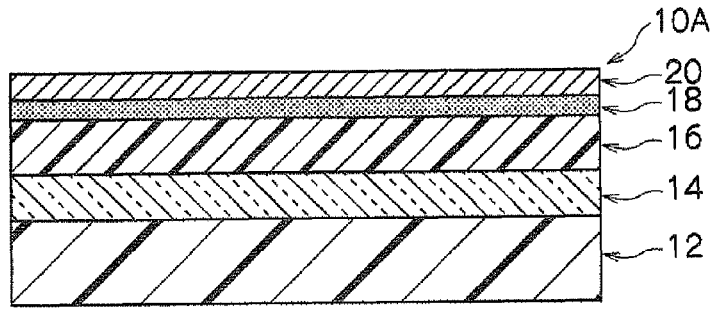
FIG. 2A to FIG. 2D are diagrams schematically showing a process for producing a polymer optical waveguide according to the first exemplary embodiment of the invention.

A multilayer sheet 10A is prepared, in which a first layer (lower cladding layer) 12 serving as a lower cladding is provided; a second layer (core layer) 14 from which the cores 14a, 14b and 14c ate formed, and which has a higher refractive index than that of the first layer 12, and a third layer (upper cladding layer) 16 serving as the upper cladding, which has a lower refractive index than that of the second layer 14, are stacked in this order on the first layer; and a metal layer 20 (conductive layer 20) is provided on the third layer 16, with an adhesive layer 18 interposed therebetween (FIG. 2A).

Here, the metal layer 20 may be directly provided on a third layer 16 which also serves as an adhesive layer 18, without providing a separate adhesive layer 18. Furthermore, the conductive layer 20 may be provided not on one side only, but on both sides, that is, on both the first layer 12 and the third layer 16.

Since the first layer 12 and the third layer 16 serve as claddings, these layers are required to have refractive indices lower than that of the second layer (core layer) 14. The difference in the refractive index between the core layer 14 and the cladding layers 12 and 16 is appropriately determined from the divergence angle of the light incident to the waveguide 10 of the invention, the numerical aperture (NA) of an optical device to be connected, the diameter of curvature of the optical waveguide 10, and the like.

The lower cladding layer 12 and the upper cladding layer 16 are not necessarily formed from the same material, but it is preferable that the layers are formed from the same material, in view of convenience and optical design.

The thickness of the core layer 14, which affects the height of the cores 14a, 14b and 14c, is determined in consideration of the efficiency of connection with an optical device to be connected with the waveguide 10 of the invention, or the like.

On the other hand, the thickness of the cladding layers 12 and 16 are each preferably made thin, for the purpose of increasing flexibility of the waveguide 10 within a range in which the mechanical strength of the waveguide is maintained. The details will be described in the recitation of subsequent processes, but the cladding layers need to each have at least a thickness that does not impair the accuracy in forming respective bottom of the grooves 22, 24a and 24b in the cladding layers 12 and 16.

The metal layer 20 may be formed from a wide variety of materials such as gold, silver, copper, aluminum, and alloys thereof as long as the layer is capable of electrical conduction. The metal layer 20 is preferably formed from copper from the viewpoints of cost and adhesiveness, and it is preferable to form the metal layer by adhering copper foil to the upper cladding layer 16, with an adhesive layer 18 interposed therebetween, from the viewpoints of convenience and adhesive strength.

In the case of using copper foil, a significant adhesive strength is required for the adhesion to the adhesive layer 18, and it is preferable to treat the surface of adhesion of the copper foil by surface roughening processing in advance.

The thickness of the metal layer 20 may also be set in accordance with the material, such that appropriate impedance and withstand current are secured when the metal layer 20 is partitioned to form the conductive wires 20a and 20b during the subsequent formation of grooves. However, the thickness is preferably 20 μm or less, and more preferably 15 μm or less, for the purpose of imparting flexibility to the waveguide 10.

The material of the adhesive layer 18 is not particularly limited, but a strength which does not cause peeling of the metal layer 20 even during the subsequent formation of grooves, is required. It is also preferable to make the adhesive layer 18 as thin as possible for the purpose of maintaining flexibility of the waveguide 10, and the thickness is preferably 30 μm or less, and more preferably 10 μm or less.

(2) Formation of First Groove

Figure 2B:
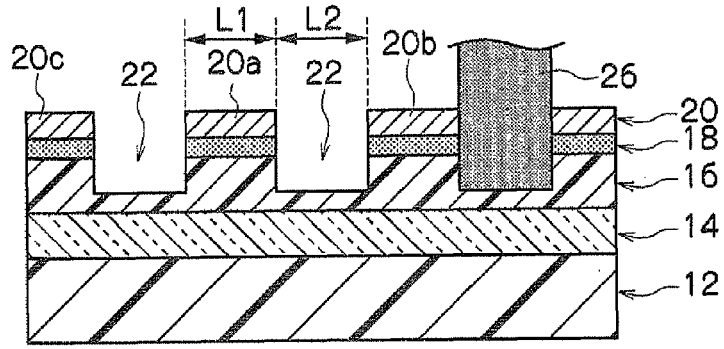

Subsequently, first grooves 22 are each formed by cutting at least the metal layer 20 using a first blade 26, from the side of the metal layer 20 of the multilayer sheet 10A in the thickness direction (FIG. 2B). As such, the metal layer 20 is partitioned by forming plural first grooves 22 in the multilayer sheet 10A, whereby conductive wires 20a and 20b are formed.

As an apparatus for forming the first groove 22, a dicing saw having the blade 26 that rotates at a high speed, is preferable from the viewpoints that accuracy in the horizontal direction or in the cutting depth is realized at a micrometer level, and that optically flat and smooth lateral surfaces of the cut grooves are formed by optimizing the surface roughness, material and cutting speed of the blade 26.

Upon forming the first grooves 22, the metal layer 20 is cut such that the bottom (lower end) of each of the first grooves 22 is located, for example, at a position lower than the metal layer 20 and higher than the core layer 14, that is, in the adhesive layer 18 or the upper cladding layer 16, whereby the metal layer 20 is partitioned, and the conductive wires 20a and 20b are formed without partitioning the core layer 14. In such a cutting method, it is preferable to set the height of the blade 26 from the mounting stage thereof that is, so-called blade height, to be higher than the core layer 14 and lower than the metal layer 20. However, when the positional accuracy of the height of the blade 26 and the thickness irregularity of the multilayer sheet are taken into consideration, cutting is performed such that the lower end of the blade 26 is located at preferably between 5 μm or higher from the core layer 14 and 5 μm or lower from the metal layer 20, and more preferably between 7 μm or higher from the core layer 14 and 7 μm or lower from the metal layer 20.

When the first groove 22 is formed, a portion of the core layer 14 may also be cut using the first blade 26 to adjust the height of the cores 14a, 14b or 14c. In this case, by forming the first groove 22 and also cutting a portion of the core layer 14, the bottom of the first groove 22 can serve as the upper surfaces of the cores 14a, 14b and 14c (i.e., surfaces on the conductive wire side). As a result, the height of the waveguide cores 14a, 14b and 14c can be controlled, and when combined with the adjustment of the distance between the second grooves 24a and 24b, the cross-sectional shapes of the waveguide cores 14a, 14b and 14c can be controlled.

Since the distance L1 between two adjacent first grooves 22 becomes the width of the conductive wire 20a or 20b that is formed between these grooves 22, the distance L1 may be appropriately determined in accordance with the use of the waveguide 10. Also, the widths L2 of the first grooves 22 may be determined by taking into consideration of the widths of the cores 14a, 14b and 14c that are formed together with the second grooves 24a and 24b in the subsequent process.

In the formation of the first grooves 22, one first groove 22 may be formed through a single cutting using a blade 26 having a width (thickness) that is equivalent to the width L2 of the first groove 22 to be formed, or one first groove 22 may be formed through several cuttings using a blade having a width smaller than L2. However, from the viewpoints of the number of processes and uniformity of the cutting depth, it is preferable that a first groove 22 is formed using a blade 26 having a width that is equivalent to the width L2 of the first groove 22 to be formed.

When the conductive wires 20a and 20b formed by partitioning the conductive layer 20 are connected to another high frequency device or line, impedance matching is often attempted. However, in a configuration where electrical lines are formed on one side or on both sides of the multilayer sheet 10A, as is the case of the present exemplary embodiment, impedance design is carried out based on the width of the electrical line (L1), the width between the electrical lines (L2), or the dielectric constant between the electrical lines, as in the case of a flexible printed board (FPC).

(3) Formation of Second Groove

Figure 2C:
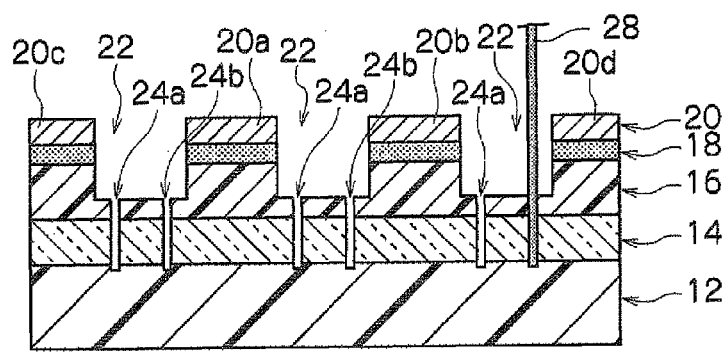

Subsequently, second grooves 24a and 24b are formed by cutting portions of the first groove 22 more deeply with a second blade 28, whereby both lateral surfaces of each of the cores 14a, 14b and 14c are formed (FIG. 2C).

In the present exemplary embodiment, the lateral surfaces of the waveguide cores 14a, 14b and 14c are formed by cutting a portion in the inner side of each first groove 22 more deeply, and thereby forming two second grooves 24a and 24b therein, respectively. Accordingly, cutting is performed such that the bottom (lower end) of the second grooves 24a and 24b is located at a position lower than the core layer 14 and higher than the bottom surface of the multilayer sheet 10A, that is, in the lower cladding layer 12.

The flatness of the core lateral surfaces formed through the formation of the second grooves 24a and 24b affects the loss of light propagated through the waveguide cores 14a, 14b and 14c, and therefore, it is necessary that the core lateral surfaces be optically flat. The roughness, material, cutting speed and the like of the blade 28, which affect the flatness of the core lateral surfaces, may be appropriately determined in accordance with the core material that is subject to cutting.

In the case of forming the core lateral surfaces by cutting the cladding layers 16 and 12 and the core layer 14 with the blade 28, if the metal layer 20 is also cut at the same time, metal powder generated by the cutting of the metal layer 20 clogs the blade, whereby the optical flatness of the core lateral surfaces decreases. On the other hand, if the core lateral surfaces are formed by forming the plural second grooves 24a and 24b on the inner side of the first groove 22 using a blade (second blade) having a smaller thickness than the width of the first groove 22 as in the case of the present exemplary embodiment, clogging of the blade 28 due to the metal powder is prevented, and optically flat core lateral surfaces are formed.

The distance between the second grooves 24a and 24b that form each of the cores 14a, 14b and 14c is adjusted to, for example, a length equivalent to the thickness of the core layer 14.

When the conductive layer 20 is partitioned by the formation of the first grooves 22, the conductive wires 20a and 20b in an array structure are easily formed, and through the formation of the second grooves 24a and 24b, an optical waveguide 10 having conductive wires, which has high accuracy of positions between the respective conductive wires 20a and 20b, between the waveguide cores 14a, 14b and 14c, or between the waveguide 10 and the conductive wires 20a and 20b, is obtained.

When the width of each of the second grooves 24a and 24b is too narrow, filling of the dielectric material 30 becomes difficult when a dielectric material 30 that serves as a cladding in the subsequent processes is to be filled, and there is a risk in that air bubbles are generated, which provides an adverse effect on the optical properties of the waveguide 10. Accordingly, the widths of the second grooves 24a and 24b are each preferably 30 μm or more, and more preferably 50 μm or more.

Each of the second grooves 24a and 24b may also be formed by several cuttings, but from the viewpoint of the number of processes or the like, it is preferable to form one groove by a single cutting.

The waveguide cores 14a, 14b and 14c formed by sequentially forming the first grooves 22 and the second grooves 24a and 24b as described above, do not have the metal layer 20 on the upper side, and therefore, the core lines are observed from the side of the upper cladding of the waveguide 10. Accordingly, alignment at high accuracy is easily realized in the connection of the core end and an optical device such as a light emitting/receiving device or an optical fiber.

Furthermore, since the first grooves 22 and the second grooves 24a and 24b are formed using a dicing saw, the positional accuracy of them are extremely high, and adjustment of the alignment of the waveguide 10 and a device to be connected can be more easily carried out even by means of metal lines having high contrast.

When the first grooves 22 and the second grooves 24a and 24b are respectively formed, each of the grooves 22, 24a and 24b may be formed in such a manner that the same spindle is used for respectively holding the blades 26 and 28, and only the blades are exchanged for respective grooves. However, the exchange of the blades may cause deterioration in the positional accuracy owing to a dress treatment of the blade, temporary removal of the work (multilayer sheet) from the specimen stage, or the like. Therefore, it is preferable to form the grooves using a dicing saw having two spindles, without removing the work from the specimen stage.

(4) Filling of Dielectric Material in Grooves

Even when the first grooves 22 and the second grooves 24a and 24b are in a state that have not been modified after the formation of respective grooves 22, 24a and 24b, that is, in a state of having air present in the respective grooves 22, 24a and 24b, the light propagation function of the waveguide cores 14a, 14b and 14c, and transmission of electrical signals, electric power supply, earth line function and the like by the conductive wires 20a and 20b can be accomplished. However, from the viewpoints of protection of the lateral surfaces of the waveguide cores 14a, 14b and 14c, protection of the lateral surfaces of the conductive wires 20a and 20b, impedance adjustment, and the like, it is preferable to fill the respective grooves 22, 24a and 24b with a dielectric material 30.

Since the dielectric material 30 to be filled in the second grooves 24a and 24b serves as a cladding, it is required that the dielectric material has a lower refractive index than that of the core layer 14. In view of taking the role of cladding as such, or of convenience, it is preferable that the dielectric material 30 be formed from the same material as the cladding material constituting the first layer 12 or the second layer 14. As a result, the influence of thermal contraction is reduced, and the adhesive power of the cladding becomes satisfactory, whereby a waveguide having higher bending durability and environmental durability is obtained.

Figure 2D:
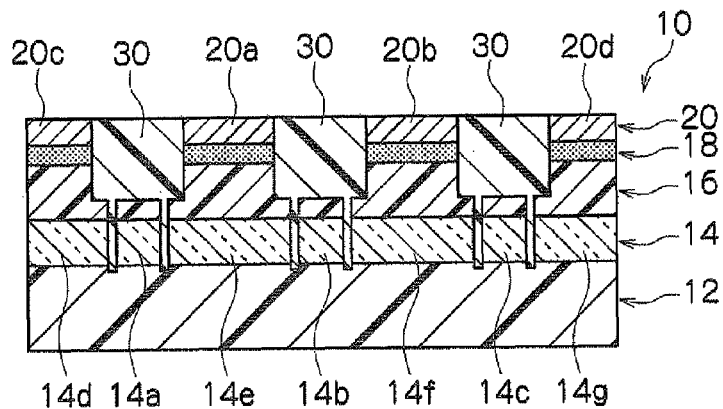

For example, it is preferable that a liquid cladding material may be filled in the grooves 22, 24a and 24b by adding the material dropwise from the side of the conductive layer 20 and by spin coating, followed by curing by applying treatments such as ultraviolet irradiation or heating, depending on the cladding material (FIG. 2D).

(5) Formation of External Shape

After the grooves 22, 24a and 24b have been filled with the dielectric material 30, the external shape of the sheet is formed with a dicing saw in accordance with the use. As a result, a polymer optical waveguide 10 having conductive wires 20a and 20b is obtained.

As described above, in the first exemplary embodiment, cutting is performed in such a manner that two second grooves 24a and 24b are formed completely inside of the first groove 22, using the blades 26 and 28 having different blade thicknesses. Further, three or more second grooves 22 may be formed inside the first groove 22, as long as the width of the first groove is greater than the distance between the second grooves that are the farthest from each other. Moreover, similar to the following second exemplary embodiment, the first groove and the second grooves may be formed using blades having the same thickness.

Second Exemplary Embodiment

Figure 3A:
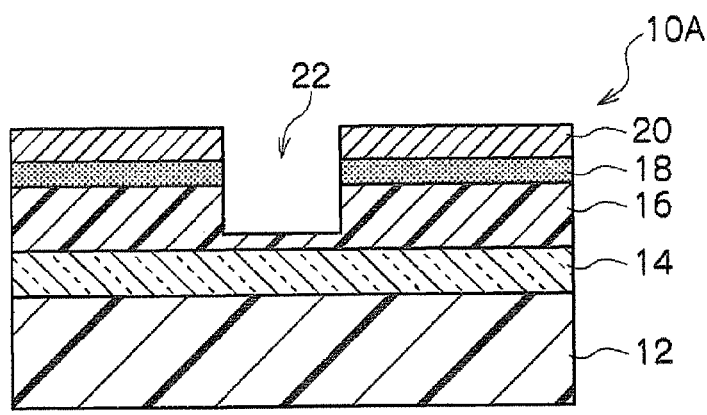
FIG. 3A to FIG. 3C are diagrams schematically showing the configuration of a polymer optical waveguide according to the second exemplary embodiment of the invention.
Figure 3B:
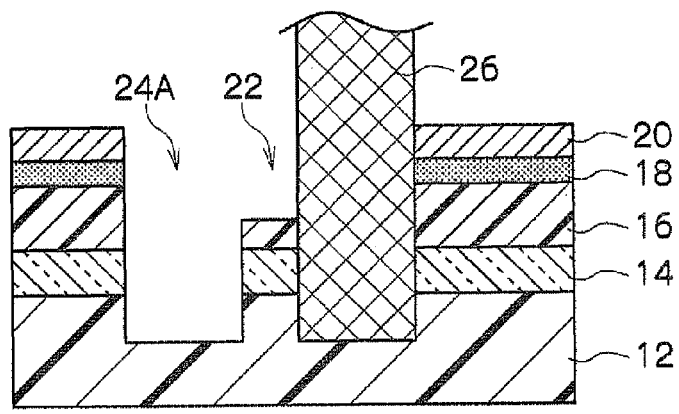
Figure 3C:
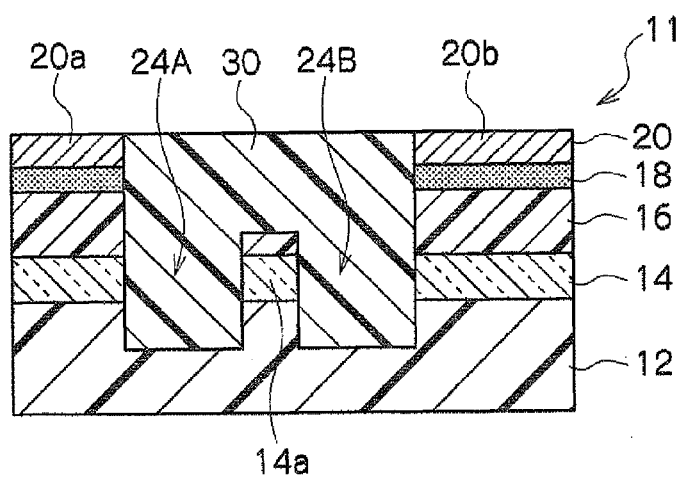

FIGS. 3A to 3C schematically show the processes for the production of a polymer optical waveguide 11 according to a second exemplary embodiment of the invention.

In the same manner as in the first exemplary embodiment, a multilayer sheet 10A having attached a conductive layer (copper foil 20) is provided, and the copper foil 20, adhesive layer 18 and upper cladding layer 16 are cut from the side of the copper foil 20, to thereby form the first groove 22 (FIG. 3A).

Subsequently, two second grooves 24A and 24B are formed by cutting two times such that portions of the multilayer sheet 10A (optical waveguide 11), which include the two lateral surfaces of the first groove 22, are also cut (FIG. 3B).

Upon forming the second groves 24A and 24B in this way, the blade 26 also cuts the conductive layer 20 in areas outside of the first groove 22, and the blade 26 does not cut the conductive layer 20 in an area inside of the first groove 22, and cuts portions of the upper cladding layer 16, the core layer 14, and a portion of the lower cladding layer 12. Therefore, clogging of the blade 26 due to powder generated by cutting of the metal is prevented, and core lateral surfaces having high flatness can be formed together with the second grooves 24A and 24B.

Subsequently, the first groove 22 and the second grooves 24A and 2413 are filled with a dielectric material 30 (FIG. 3C). For example, a liquid cladding material may be filled in the respective grooves 22, 24A and 24B by adding the material dropwise from the side of the conductive layer 20 and by spin coating, followed by curing by applying a treatment such as ultraviolet irradiation or heating, depending on the cladding material.

As a result, a polymer optical waveguide 11 having conductive wires 20a and 20b according to the second exemplary embodiment is produced.

In the second exemplary embodiment, the core 14a and the conductive wires 20a and 20b extend through a longitudinal direction of the polymer optical waveguide 11. Also, as in the first exemplary embodiment, the polymer optical waveguide 11 has a sheet shape, which means that the polymer optical waveguide 10 has substantially planar outer surfaces.

As described above, also in this exemplary embodiment, the loss of propagation is suppressed because core lateral surfaces having high optical flatness are formed, and also, core lines are observed from the upper cladding side of the waveguide because the waveguide core does not have a metal layer 20 on the upper side; therefore, alignment at high accuracy is easily realized in the connection of the core end and an optical device.

EXAMPLES

Hereinafter, the present invention will be specifically described by way of Examples, but the present invention is not intended to be limited to these Examples.

Example 1

A three-layered multilayer sheet (11 mm×110 mm) is prepared, in which a first layer (lower cladding layer) formed from an acrylic polymer and having a refractive index of 1.51 and a thickness of 25 µm, a second layer (core layer) formed from an acrylic polymer and having a refractive index of 1.55 and a thickness of 50 µm, and a third layer (upper cladding layer) formed from the same material as that of the first layer and having a thickness of 25 µm, are stacked in this order.

Next, an adhesive layer (thickness: 10 µm) formed from an ultraviolet-curable acrylic resin is formed on the upper cladding layer of the three-layered sheet by a spin coating method. Subsequently, a copper foil having one surface treated by surface roughening processing (manufactured by Nippon Mining & Metals Co., Ltd., thickness: 12 µm) is adhered with an extender, so that the rough surface side faces the adhesive layer. Ultraviolet radiation is applied from the lower cladding layer side of the multilayer sheet to cure the adhesive layer, whereby a copper foil-attached multilayer sheet having a thickness of 120 µm in total is prepared (FIG. 2A).

Subsequently, the copper foil-attached multilayer sheet is pasted to a work fixing sheet (thickness of 170 µm) having an ultraviolet-curable, uncured resin on a surface thereof, in such a manner that the lower cladding layer of the multilayer sheet and the uncured resin surface of the fixing sheet are bonded, and then, the whole assembly is fixed to a metal ring. The resultant product is fixed on a specimen stage (chuck table) of a dicing saw (manufactured by DISCO, Inc., DFD6361, trade name), to which two rotating blades can be attached.

A blade having a thickness of 250 µm is attached to a first rotating shaft of the dicing saw, while a blade having a thickness of 30 µm is attached to a second rotating shaft.

First, the copper foil, the adhesive layer and a portion of the upper cladding layer are cut in the thickness direction from the side of the metal layer, with the blade attached to the first rotating shaft, which has a thickness of 250 µm and is rotating at 30,000 rpm. Thus, a first groove having a width of 250 µm is formed (FIG. 2B).

Subsequently two second grooves are formed inside the first groove, with the blade attached to the second rotating shaft of the dicing saw, which has a thickness of 30 µm and is rotating at 30,000 rpm. These second grooves each have a width of 30 µm, with the bottom being located in the lower cladding layer, and are formed at a distance of 90 µm, such that the center of the interval between the second grooves overlaps with the center of the first groove (FIG. 2C).

Finally, the first groove and the second grooves are filled with the same ultraviolet-curable acrylic polymer material (refractive index after curing is 1.51) as the materials of the first layer and the third layer (claddings), and then the acrylic polymer material is cured by ultraviolet irradiation (FIG. 2D).

Through the processes as described above, a polymer optical waveguide having conductive wires is produced.

The loss of propagation of the thus-produced waveguide core is measured, and is found to be 11.1 dB/cm. Electrical conduction through the conductive lines is confirmed, and at the same time, signal transmission at 0.4 Vpp with a PRBS ($2^7-1$) at a rate of 50 Mbps is confirmed.

Comparative Example 1

A multilayer sheet having a copper foil adhered on the upper cladding layer thereof is prepared by the same technique as that used in Example 1. Subsequently, the multilayer sheet is cut in the thickness direction from the copper foil side, with a dicing saw (manufactured by DISCO, Inc., DFD6361, trade name) equipped with a blade having a thickness of 30 µm. Grooves are formed at a distance of 90 µm such that the bottoms of the grooves are located at the bottom or in the lower cladding layer. The respective grooves are filled with an ultraviolet-curable acrylic polymer material (refractive index after curing is 1.51), which is the same as the materials of the first layer and the third layer (claddings), and then the acrylic polymer material is cured by ultraviolet irradiation.

The loss of propagation of the thus-produced waveguide core is measured, and is found to be 5.9 dB/cm.

What is claimed is:

1. A polymer optical waveguide, comprising:
   at least one core through which light propagates;
   a cladding which is composed of a plurality of cladding layers, which surrounds the core and which has a refractive index less than that of the core; and
   at least one conductive wire being provided on at least one side of the cladding,
   the conductive wire comprising a conductive layer which is provided on the at least one side of the cladding and being partitioned by a first groove,
   the core being formed between a second groove and a third groove, each of which is formed in at least a part of the first groove, and the second groove and the third groove each including a substantially flat outer surface that extends in a direction perpendicular to a direction in which a bottom of the first groove extends.

2. The polymer optical waveguide according to claim 1, wherein the first groove, the second groove, and the third groove are each filled with a dielectric material.

3. The polymer optical waveguide according to claim 1, wherein the bottom of the first groove is located in the cladding at a position between the conductive wire and the core.

4. The polymer optical waveguide according to claim 1, further comprising an adhesive layer provided between the conductive wire and the cladding.

5. The polymer optical waveguide according to claim 4, wherein the bottom of the first groove is located in the adhesive layer.

6. The polymer optical waveguide according to claim 1, wherein the bottom of the first groove serves as one surface of the core.

7. The polymer optical waveguide according to claim 1, wherein the second groove and the third groove are formed inside of the first groove, and a width of the first groove is greater than a distance between the second groove and the third groove.

8. The polymer optical waveguide according to claim 1, wherein the first groove, the second groove and the third groove are filled with a dielectric material that is a same material as at least one of the plurality of cladding layers.

9. The polymer optical waveguide according to claim 1, wherein, when viewed from a waveguide direction, the conductive wire becomes partitioned by the first groove in a direction perpendicular to the waveguide direction.

* * * * *